United States Patent

[11] 3,618,588

[72] Inventors Mohammad H. Anwar
Tappan;
Marvin Calderon, Hyde Park, both of N.Y.
[21] Appl. No. 791,131
[22] Filed Jan. 14, 1969
[45] Patented Nov. 9, 1971
[73] Assignee Pepsi Co., Inc.
Long Island City, N.Y.

[54] CARAMEL COLOR MANUFACTURE
9 Claims, No Drawings

[52] U.S. Cl. ................................................. 127/34,
99/148
[51] Int. Cl. .................................................. A23g 3/32
[50] Field of Search ...................................... 99/148;
127/34

[56] References Cited
UNITED STATES PATENTS
3,385,733  5/1968  Ackermann................. 99/148 X
2,582,261  1/1952  Longenecker............... 127/34
1,316,019  9/1919  Daniel......................... 127/34

OTHER REFERENCES

Winton et al., "The Structure and Composition of Foods," 1935, Vol. II, John Wiley & Sons, Inc., New York, pages 485, 486, 567, 613, 706, (Copy in Group 172)

*Primary Examiner*—Joseph M. Golian
*Attorney*—Roylance, Abrams, Berdo & Kaul

ABSTRACT: Caramel color is produced from fruit by heating the juice of the fruit in the presence of a caramelization catalyst and removing fruit flavor components during the process.

CARAMEL COLOR MANUFACTURE

This invention relates to the manufacture of caramel color from fruit. More particularly, it relates to a process for the manufacture of caramel color which is more economical than present processes and is suitable for use in the production of beverages.

Caramel is a well-known and staple commercial material. It is an amorphous, dark-brown material that has been produced by the carefully controlled heat treatment of saccharine materials such as dextrose, invert sugar, lactose, malt syrup, molasses, sucrose, starch hydrolysates and fractions thereof, etc. The heavy-bodied, almost black syrup contains color components that impart the amber shade found in carbonated beverages, pharmaceutical and flavoring extracts, candies, soups, bakery products, and numerous other foods.

More recently, caramel has been employed as an emulsifying agent for water insoluble materials. The employment of caramel in this manner is described in Application Ser. No. 329,968 to Anwar and Calderon, filed Dec. 12, 1963, the disclosure of which is hereby incorporated by reference. Thus, flavoring oils in carbonated beverages including orange oil, lemon oil, distilled lime oil, grapefruit oil, and other citrus oils, clove oil, peppermint oil, ginger oil, wintergreen oil, cassia oil, cinnamon oil, lemongrass oil, teaseed oil, etc. may be successfully suspended in beverages employing caramel as the emulsifying agent. This permits the preparation of soft drinks without the need for emulsifying agents, such as natural gums, which contain contaminants harmful to processing equipment and which have a deleterious effect on the final beverage, e.g., by causing oxidation or polymerization of the flavoring oils.

Caramel color has been produced commercially by heating highly refined corn sugars, in the presence of certain catalysts or reagents which permit the caramelization of the sugar. Caramelization involves the simultaneous processes of inversion and reversion. Higher carbohydrate molecules in the refined sugars are hydrolized (inversion) under pressure, heat and acidity to simpler monosaccharides, which in turn, are polymerized (reversion) under the same conditions in conjunction with nitrogen and sulfur.

Refined sugars, such as dextrose and sucrose, have been employed for this purpose. The dextrose, which is a monosaccharide, may be reacted with the catalyst and it will polymerize under the influence of heat and a small amount of ammonia or ammonium salt to form the colored caramel product. Sucrose being a disaccharide, must be hydrolyzed to form monosaccharides before the addition of the catalyst for the caramelization process. In order to produce a uniform caramel color with definite analytical standards with respect to tinctorial power (color intensity), Baume, flavor, stability, etc., it has been the practice to employ the highly refined sugars such as the corn sugars as the raw material in producing caramel. Tremendous quantities of caramel color are manufactured annually in the United States. It has been estimated that annual caramel color production exceeds 100 million pounds. The employment of the highly refined carbohydrates in the caramelization process is very costly. It would be highly desirable if less expensive carbohydrates could be employed as the source of monosaccharide in the caramel process.

Accordingly, it is an object of the present invention to produce caramel color from a relatively inexpensive source of carbohydrates.

A further object of the present invention is to provide caramel color suitable for use in beverages.

Another object of the present invention is to provide a relatively simple process for the production of caramel color suitable for use in other products, such as baked goods, candies, pharmaceutical ointments, creams or lotions, hair dressings, suntan oils, cough syrups, polishes, etc.

Another object of the invention is to provide a caramel having a good shelf life in that it will remain free flowing for long periods of time.

These and other objects of the present invention are accomplished by the process of the present invention which comprises forming an admixture of fruit juice having a sufficiently high carbohydrate content to caramelize and a caramelization catalyst, heating the admixture under pressure to caramelization temperature, continuing the heating for a time sufficient to caramelize the carbohydrate content of the fruit juice, removing flavoring components from the caramelization product and cooling the resultant caramel color.

Surprisingly, it has been found that a high quality caramel color having high acid stability can be simply produced from the carbohydrate content of ordinary unrefined fruit and fruit juices. Thus, the process of the present invention employs those carbohydrates which are in natural, untreated fruit or the juice prepared from the fruit as the raw material in the present caramelization process.

Suitable fruits that may be employed as the raw material for the monosaccharide starting material in the caramelization process in the present invention include the fruit of any seed bearing plant, for example, apples, pears, peaches, grapes, dates, berries, figs, and the like. In most fruits, there are sufficient monosaccharides, i.e., dextrose and levulose, present to polymerize and caramelize thus forming a highly suitable, colored caramel product. However, in those instances where insufficient monosaccharides are present in the fruit, it may be desirable to hydrolyze the polysaccharides therein to monosaccharides, that are suitable for the caramelization process. Any suitable means of hydrolysis may be employed. Thus, for example, the polysaccharide content of the fruit may be hydrolyzed to monosaccharide by adjusting the pH of the fruit to the proper level and heating for a predetermined time.

Any seed bearing fruit may be employed as a raw material for the caramelization process of the present invention. However, it is usually desirable to convert the fruit to juice form in order to place it in a form suitable for use in the caramelization process.

In some cases, for instance in dates, carbohydrates are extracted in an aqueous system with the pits and other undesirable components being removed before the caramelization process. Any suitable caramelization catalyst may be employed in the caramelization of the carbohydrate content of the fruit. A wide variety of such catalysts may be employed and these include, for example, acids e.g., acetic acid, citric acid, phosphoric acid, sulfuric acid and sulfurous acid; alkalis (e.g., ammonium hydroxide, potassium hydroxide and sodium hydroxide); and salts (e.g., ammonium, sodium or potassium carbonates, bicarbonates, dibasic phosphates or monobasic phosphates). An especially preferred caramelization catalyst for employment in the present invention is produced by combining ammonia, sulfur dioxide, water and sodium hydroxide to form the ammonium and sodium salts of sulfurous and sulfuric acid. Suitable amounts of the caramelization catalyst which may be employed in the present process include between about 4 and about 20 percent preferably between about 8 and about 16 percent based on the weight of dry salts against the total carbohydrate present.

The caramelization conditions employed for converting the fruit to caramel color will be varied over a wide range and will depend, at least to some extent, upon the particular color of caramel desired. However, suitable temperatures include those in the range of between about 222° and about 350° F., preferably between about 230° and about 320° F. The caramelization process is conducted under pressure. The term "under pressure" as employed herein includes pressures of between about atmospheric and about 75 p.s.i.g., preferably between about 10 and about 60 p.s.i.g. The time required for caramelization may vary from between about 2 hours and about 12 hours, preferably between about 4 and about 10 hours depending upon the tinctorial power of caramel color desired.

The caramelization process may be suitably conducted by placing the fruit in a reaction kettle along with the careful addition of the caramelization catalyst, e.g., ammonia, and ammonium and alkali salts of sulfurous and sulfuric acid. This admixture is then heated under pressure for a period of, for example, 1 or 2 hours or for a time sufficient to give the ammonium and sulfite ions time to react initially with the sugars present. Water is released from the polymerization of the monosaccharide and from the color reaction. Next, a portion of the water and the flavor components of the particular juice being treated are removed so as to permit the production of a caramel of acceptable flavor and with as little flavor of the original fruit as possible. It is essential that the flavor components be removed, since they can adversely affect the quality of the final product in which the caramel is employed.

The removal of the fruit flavor components may be conducted in any suitable manner. For example, a flash distillation of the caramel may be achieved by merely releasing the pressure on the system so as to drive the flavor components off. At this point the temperature of the system may be reduced to temporarily stop the caramelization reaction. Another suitable method which may be employed is, for example, steam distillation of the caramel under pressure and continued caramelization at the same time. However, flash distillation by pressure release is the preferred method of conducting the flavor component removal portion of the process of the present invention.

After the flavor components are removed by flash distillation or the like, the caramelization process may be resumed by increasing the temperature of the system. The caramelization of the monosaccharides is continued until the desired color and quality of the caramel is achieved. Thus, the caramelization process may be continued for a period of time between about 2 hours and about 10 hours, for example. Next, the Baume of the finished caramel may be adjusted at this point if desired. Thus, cool water may be added to the system for the dual purpose of diluting the caramel and stopping the caramelization reaction. For the caramelization process, the admixture of caramelization catalyst and fruit juice may be adjusted to a specific gravity of between about 25° and about 40°, preferably between about 29° and about 38°.

The system comprising the caramel color may then be cooled and filtered or passed to a clarifying centrifuge, if desired, for the removal of any insoluble solids. For example, a filter press precoated with a filter aid may be employed. Finally, the pH of the caramel color may be adjusted to a desired level, e.g., between about 2.5 and about 3.5 pH, since the pH of the caramel may decrease as the reaction proceeds. This adjustment may be made by adding a solution of alkaline materials, such as sodium hydroxide or potassium hydroxide.

In the foregoing manner, a caramelization process is provided employing a relatively inexpensive raw material, viz., fruit, as the source of carbohydrate in the production of the caramel color. The resulting caramel has a good shelf life and will thus remain free flowing for long periods of time. Also, the tinctorial power of the caramel may be varied over a wide range by the employment of the present process by merely selecting the proper process conditions.

In addition, the caramel of the present invention has excellent acid fastness, i.e., a high stability in an acid solution.

It is highly important that the caramel for acidic beverages have such stability because the presence of acids may tend to cause precipitation or sedimentation of color bodies from the caramel color itself. These flocs or sediment are highly objectionable in beverages since obviously they impair the appearance of the beverage.

Further, caramel produced by the process of the present invention may be negatively or positively charged depending on the nature of the product in which it is to be used. Thus, it will react with and precipitate oppositely charged colloids, but will help suspend other similarly charged particles.

The raw materials for the process of the present invention may be fruit, the juice of such fruit or the concentrated juices of such fruit. If the starting material is the whole fruit, it may be crushed and/or pressed in equipment conventionally employed for this purpose to form a juice or puree. Next, the insoluble material, such as fibrous material, pectins, tannins, and proteinaceous materials may or may not be separated by filtration or centrifuging or other appropriate means from the juice. However, such physical separation of these materials is not necessary at this point in the process and may be done at the end of the caramelization process.

In most instances, the monosaccharide content of the food is sufficiently high that the caramelization of the fruit may now be conducted. However, as previously mentioned, if there is not sufficient monosaccharide present for caramel production the carbohydrate in the fruit may be hydrolyzed in any suitable manner. Thus, for example, the pH of the juice may be lowered with a food grade acid, for example, phosphoric, citric, tartatic, fumaric, adipic, malic, or mixtures thereof, to a pH of between about 1.0 and about 3.0. The temperature of the mixture is then raised to between about 200° and about 250° F. for a period of between about 15 minutes and about 2 hours. Such treatment converts the polysaccharide content of the juice by hydrolysis to monosaccharides.

THe following examples will illustrate the practice of the present invention. They are presented for illustrative purposes only and should not be construed as limiting the scope of the invention in any way.

EXAMPLE 1

A predetermined amount of apples are crushed and pressed into juice form and are passed through a filter for the removal of fibrous material and other insolubles The fruit juice is placed in a reaction kettle which may be coke-fired, gas-fired, Dowtherm or may be heated by high-pressue steam. Since the fruit has a sufficiently high monosaccharide content, hydrolysis is not required at this stage. The viscosity of the juice is adjusted to the desired concentration by driving off a predetermined amount of water.

Next, a caramelization catalyst comprising a mixture of ammonia, and ammonium and sodium salts of sulfurous and sulfuric acid is carefully added to the vessel and the temperature of the vessel is increased to about 252° F. and a pressure of about 15 p.s.i.g. The fruit juice-catalyst admixture is heated for about 2 hours under this pressure. Next, a valve is opened and the pressure is reduced to atmospheric, while lowering the temperature to about 215° to 220° F. At this point, water is distilled off along with volatile components which characterize the flavor of the apple juice. The caramel color remaining in the vessel now has an acceptable flavor. The temperature is raised to 275° F. and the caramelization process is continued under pressure for a period of about 5 hours. At the end of this time the specific gravity of the finished caramel is adjusted to about 25°–40° B. and the batch is cooled quickly by the addition of cool water and filtered. Next, the pH of the caramel color is adjusted to about 3.0 with the addition of an alkaline material, e.g., sodium hydroxide.

The resulting caramel color is boiled in phosphoric acid for a period of 5 minutes and is stored in a glass flask for a period of about 6 weeks. The resulting caramel color has excellent acid fastness and upon viewing the flask at the end of this time it is seen that precipitation of color bodies in the caramel has not occurred. Thus, it may be concluded that this caramel color is suitable for employment in beverages such as carbonated soft drinks and the like.

EXAMPLE 2

Concentrated lemon juice having a specific gravity of between about 25° and about 40° B. is pumped into a pressurized vessel and the temperature is raised slowly to about 300° F. while under a pressure of about 65 p.s.i.g. Meanwhile, the catalyst of example 1 is slowly added to the vessel and when the temperature reaches 300° F. the caramelization is conducted for a period of about one hour. Next, a valve on the pressurized vessel is open and the lemon flavor components are released thus eliminating the characteristic lemon flavor from the caramel.

Next, the caramelization process is continued for a period of about 8 hours after which time the temperature is quickly lowered on the system and the pH of the product of the caramel color is adjusted to a desired level.

The resulting caramel color is stable and remains free flowing for long periods of time.

EXAMPLE 3

For comparative purposes, a single fold portion of lemon juice is placed in a pressurized vessel and is concentrated to between about 25° and about 40° B. The catalyst of the previous example is added and the caramelization process is conducted in the manner described in example 2.

The resulting caramel color is acid fast and has a good shelf life.

EXAMPLE 4

A portion of berries having an especially low monosaccharide content, but which have a sufficiently high polysaccharide content to warrant their use in the present caramelization process are concentrated to between about 25° and about 38° B. after being crushed and pressed. The pH of the resulting berry juice is lowered to between about 1.0 and about 3.0. The juice is then heated to a temperature of between about 200° and about 250° F. for a period of between about 1 and ½ hours. During this time the polysaccharides in the fruit juice are hydrolized to a large extent.

Next, a catalyst comprising ammonium sulfite, ammonium sulfate, ammonium bisulfite, ammonium bisulfate and the corresponding sodium salts, is added to a reaction kettle containing the berry juice having an increased monosaccharide content. The system is placed under pressure and the admixture is heated to a temperature of about 310° F. while under a pressure of about 70 p.s.i.g. After a period of about 1 and ½ hours, the admixture is cooled and is then subjected to steam distillation so as to drive off the berry flavor components.

The juice is now placed in a pressurized vessel and is heated to a caramelization temperature of about 300° F. while under a pressure of about 65 p.s.i.g. The caramelization is continued for a period of about 10 hours after which time the admixture is cooled to room temperature.

The resulting caramel color is placed in a one liter flask after a portion thereof has been boiled with a mixture of fumaric acid and adipic acids for a period of 5 minutes. The resulting acid-boiled mixture is clear thus indicating excellent acid fastness. The portion of the caramel color in the flask is stored for a period of 2 months. The stored caramel has good shelf life and is free flowing.

EXAMPLE 5

A known amount of dates containing approximately 70 percent sugar is weighed into a tank. The tank is constructed in such a way that it has a 10 mesh screen and false bottom. A predetermined amount of water is pumped into the tank and then agitation is started while the temperature of the mixture is raised to about 200° F. After 30 minutes of heating at this temperature the bottom of the tank is opened and the liquid is strained into a caramel cooker. This process is repeated twice except that only one-fifth as much water is used in each washing and the heating cycle is cut down to 15 minutes each.

The pits and pulpy cellulose material on the screen is discarded. To the combined extract a caramelization catalyst comprising a mixture of ammonia and ammonium and alkaline salts of sulfurous and sulfuric acids is added. The temperature of the cooker is raised to about 225° F. in a closed system. After one hour of heating, the distillation valve is opened on top of the cooker. The condensate carrying the volatile flavor of the dates is collected until the liquid in the cooker reaches a Baume of about 35°. Since a large amount of heat is dissipated by the distillation of steam, the temperature of 225° F. is maintained by the high pressure steam jacket.

At this point the distillation valve is closed and the temperature is raised to about 275° F. corresponding to a pressure of about 35 p.s.i.g. Heat is maintained at this temperature until the desired color is obtained. Next, the caramel is cooled as quickly as possible and filtered at a temperature of 180° to 190° F. into the adjustment tank where its Baume and pH are adjusted to the desired value before pumping and further cooling through a heat exchanger into the storage tank.

The following examples illustrate the employment of the caramel produced by the process of the present invention in the production of a carbonated beverage.

EXAMPLE 6

To 100 gallons of the caramel color produced in example 1, there are added 5 gallons of orange oil. This mixture is put through a Manton Gaulin homogenizer which reduces the oil to small particles. The resultant emulsion of orange oil is stable.

In a separate tank, there are mixed in sufficient water to make 500 gallons of syrup, the following ingredients: 2.5 pounds of citric acid, 3.0 pounds of sodium citrate, 2.5 pounds of sodium benzoate, 2,500 pounds of sucrose, and 10 gallons of the emulsion of orange oil prepared as described above. This syrup is then diluted to 6 times its original volume with carbonated water to form an orange flavored beverage. The beverage is stable and has good color.

EXAMPLE 7

To 100 gallons of the caramel of example 4 there are added 7 gallons of distilled lime oil and 3 gallons of lemon oil. This mixture is put through a homogenizer which reduces the oils to small particles having an average particle size less than two microns. This emulsion is then formulated into a flavored beverage as described in example 6. A stable beverage having good color is produced.

While the caramel color of this invention has been exemplified for use in flavored beverages, it is not limited to such use. Thus, the caramel prepared in accordance with the practice of this invention may also be used in the preparation of baked goods, candies, etc., where caramel is normally used as a coloring agent.

Moreover, the caramel of this invention may be used to emulsify water insoluble materials other than flavoring oils. Thus, the caramel may be used to emulsify the water insoluble components which are used in the preparation of pharmaceutical ointments, creams or lotions, hair dressings, suntan oils, cough syrups, polishes, etc., in which the color imparted by the caramel will not be objectionable.

While the invention has been described in connection with specific embodiments, it will be understood that it is capable of further modification and is intended to cover variations without departing from the spirit and scope of the invention described in the appended claims.

What is claimed is:

1. A method for preparing caramel color which comprises forming an admixture of fruit juice having a sufficiently high carbohydrate content to caramelize and a caramelization catalyst, heating said admixture under pressure to caramelization temperature, continuing said heating at said caramelization temperature for a time sufficient to caramelize said monosaccharide content of said fruit juice, removing fruit flavor components, subjecting the caramel color to further caramelization after removal of the flavor components, and cooling the resultant caramel color.

2. The method of claim 1 wherein said juice flavor components are removed by releasing pressure on the system.

3. The method of claim 1 wherein the caramelization catalyst comprises an admixture of ammonium and alkali salts of sulfurous and sulfuric acid.

4. The method of claim 1 wherein the caramelization temperature is in the range of between about 230° and about 320° F.

5. The method of claim 1 wherein the fruit juice is obtained from fruit having a sufficiently high monosaccharide content to caramelize and form caramel color.

6. The method of claim 1 wherein the fruit is hydrolyzed to convert its polysaccharide content to monosaccharides prior to being admixed with the caramelization catalyst.

7. The process of claim 1 wherein the fruit juice has a concentration of between about 25° and about 45° B.

8. The method of claim 1 wherein said admixture is heated under a pressure of between about atmospheric and about 75 p.s.i.g.

9. The method of claim 8 wherein said admixture is heated under a pressure of between about 10 and about 60 p.s.i.g.

* * * * *